United States Patent [19]
Hamabe

[11] Patent Number: 5,491,833
[45] Date of Patent: Feb. 13, 1996

[54] MOBILE RADIO COMMUNICATION SYSTEM HAVING RADIO ZONES OF SECTOR CONFIGURATIONS AND ANTENNA SELECTING METHOD EMPLOYED THEREIN

[75] Inventor: Kojiro Hamabe, Tokyo, Japan

[73] Assignee: NEC Corporation, Tokyo, Japan

[21] Appl. No.: 359,898

[22] Filed: Dec. 20, 1994

[30] Foreign Application Priority Data

Dec. 27, 1993 [JP] Japan ................................ 5-330207

[51] Int. Cl.$^6$ ................................................. H04Q 7/00
[52] U.S. Cl. .................. 455/33.1; 455/33.2; 455/33.4; 455/33.3; 455/54.1
[58] Field of Search ............................ 455/33.1, 33.3, 455/33.4, 54.1, 56.1, 67.1; 379/59

[56] References Cited

U.S. PATENT DOCUMENTS

| | | | |
|---|---|---|---|
| 4,144,496 | 3/1979 | Cunningham et al. | 455/54.1 |
| 5,073,971 | 12/1991 | Schaeffer | 455/33.1 |
| 5,193,109 | 3/1993 | Chien-Yeh-Lee | 455/33.3 |
| 5,276,907 | 1/1994 | Median | 455/33.3 |

OTHER PUBLICATIONS

Yoshikawa et al., "Radio Zone Plans In Mobile Radio System", *Research Practical Report*, vol. 23, No. 8, (1974).
Andersson et al., "Adaptive Channel Allocation in a TIA IS-54 System", pp. 778–781, May 1992.

*Primary Examiner*—Reinhard J. Eisenzopf
*Assistant Examiner*—Marsha D. Banks-Harold
*Attorney, Agent, or Firm*—Foley & Lardner

[57] ABSTRACT

A method of selecting sector antenna which is capable of reducing interference and improving the efficiency of utilization of frequencies is applied to a mobile radio communication system wherein a plurality of sector antennas whose half-power beam widths are different from basically used normal sector antennas are used so as to cover the same areas in an overlapping state. A radio base station located within a corresponding zone covers a plurality of sector cells using the sector antennas provided for each of the corresponding sector cells. Further, some of the radio base stations employ a way to cover partial area overlapping a normal sector cell with a narrow sector cell using a sector antenna whose half-power beam width is small. Each radio base station has a predetermined constant according to the half-power beam width. When a radio terminal requests a call origination, the corresponding radio base station selects an antenna whose sum of a received level of a signal sent from the radio terminal and the constant is largest among the assignable sector antennas.

8 Claims, 3 Drawing Sheets

MOBILE RADIO COMMUNICATION SYSTEM HAVING RADIO ZONES OF SECTOR CONFIGURATIONS AND ANTENNA SELECTING METHOD EMPLOYED THEREIN

BACKGROUND OF THE INVENTION

1. Field of the Invention

The present invention relates to a cellular mobile radio communication system of a type wherein each of radio zones is covered by corresponding radio base stations, and particularly to a mobile radio communication system having radio zones in the form of sector configurations, wherein each radio zone has a plurality of antennas whose horizontal-plane half-power beam widths are different and connected directly to the radio base stations so that the radio zones are divided into sector cells corresponding to directivities of the antennas.

2. Description of the Related Arts

A mobile radio communication system such as a cellular mobile telephone system uses the same radio channel (hereinafter abbreviated as "channel") in each radio zone as far as it does not cause interference. In this type of mobile radio communication system, omni and sector zone configurations are known as the configurations of the radio zones. In the omni zone configuration, an antenna having a single horizontal plane non-directional antenna in the horizontal plane, i.e., an omnidirectional antenna is provided for a radio base station. The omnidirectional antenna covers a single radio zone in which the radio base station corresponding to the omnidirectional antenna is provided at the center. On the other hand, in the sector zone configuration, one radio base station is provided with a plurality of sector antennas each having an individual horizontal-plane radiation pattern, respectively. Further, each sector antenna covers a sectional region (hereinafter abbreviated as "sector cell") corresponding to the directivities of the sector antennas. In the sector zone configuration, since interference in the same channel is scarce, owing to the limited direction effects of the sector antennas, therefore, the distance limitation in using the same channel is shorter as compared with the omni zone configuration and the efficiency of utilization of a frequency or a channel is high. The aforementioned two configurations of radio zones have been described in detail in the article ("Radio Zone Configuring Method suitable for Car Telephone" by Yoshikawa, Nomura, Watanabe and Nagatsu, Research Practical Report, Vol. 23, No. 8, 1974). In the mobile radio communication system, a plurality of fixed or mobile radio terminals are included in the plurality of radio zones. These radio terminals communicate with other radio terminals or terminals in a public communication network through radio channels between radio base stations which belong to the radio zones in which the radio terminals exist and the radio terminals.

As typical sector configurations, a three-sector configuration comprised of three sector cells per radio base station and a six-sector configuration comprised of six sector cells per radio base station are well known However, a sector zone configuration is also considered wherein directional antennas in which each half-power beam width angle (angular width formed between two directions in which a directional gain or directivity falls 3dB in both directions from the central direction having maximum radiation intensity) has a small overlap in the three-sector configuration. Since it is easy to increase the directional gain or directivity of the directional antennas whose half-power beam width angles are small as compared with a non-directional antenna, such a sector configuration is used to cover a local service area distant from the radio base station without providing new radio base stations. A reduction in interference among upward lines (lines which radio terminals use for transmitting to the radio base station whereas the radio base station uses them for receiving) and a reduction in interference among downward lines (lines which the radio base station uses for transmitting whereas the radio terminals use them for receiving) can be achieved by using the directional antenna whose half-power beam width angles is small. Further, the same frequency can be simultaneously and repeatedly used among the nearer cells by using the smaller half power beam width angle. Accordingly, the configuration of the sector cells narrow in width overlapping the normal sector configuration such as the three-sector configuration or the like is employed in particular to furnish communications services to a concentrated area of traffic requiring assignment of a number of channels.

In a zone configuration in which a plurality of cells are overlapped using a plurality of antennas so as to cover the same area as in the case where the configuration of the sector cells narrow in width to overlap the normal sector configuration as described above, a plurality of antennas usable for communicating with a radio terminal are provided. It is thus necessary to select an antenna to be used for communication at this time.

When a plurality of sector antennas which belong to a plurality of radio base stations and the same radio base station that are usable for communicating with a radio terminal in the conventional mobile radio communication system, a received level (corresponding to the level of a desired radio wave) of a signal sent from the radio terminal is measured through each respective sector antenna. Thereafter, a sector antenna providing the maximum receiving levels is selected to perform communication between the radio terminal and its corresponding radio base station.

This method has, however, a problem in that an effect for improving the efficiency of utilization of a frequency owing to a reduction in interference by virtue of the directivity of an antenna cannot be sufficiently obtained. The reason for this is as follows. Namely, when the level of the desired radio wave received by the sector antenna whose half-power beam width of directivity is large is slightly larger than that of the desired radio wave received by the sector antenna whose half-power beam width angle is small, the conventional method of selecting the antenna capable of providing the maximum level of desired radio wave selects the sector antenna whose half-power beam width angle is large in spite of the fact that the selected sector antenna whose half-power beam width is small permits an improvement in the effect of reducing interference by the antenna directivity.

Therefore, a method of preferentially selecting a sector antenna whose half-power beam width angle is small at all times has been considered to cope with such a case.

In order to control or cut back power consumption of the radio terminal and improve the efficiency of utilization of the frequency by virtue of the reduction in interference with the upward line, a method of controlling power to be transmitted from the radio terminal so that the received level of the desired radio wave at the corresponding radio base station is kept substantially constant, has been adopted in some mobile radio communication systems. Thus, such a system enables a reduction in the transmitting power of a radio terminal so long as a sector antenna capable of securing a desired radio wave having a large level is selected upon selecting a sector antenna used for communication. However, the method of preferentially selecting always the sector antenna whose half-power beam width is small causes problems that since the sector antenna whose half-power beam width is small is selected so long as the received level of the desired radio wave is larger than the limit of allowable value for connection between the radio terminal and its corresponding radio base station even when the level of the desired radio wave received by the sector antenna whose half-power beam width angle is small is less than that of the desired radio wave received by the sector antenna whose half-power beam width is large, the radio terminal is required to increase the transmitting power, whereupon an effect for cutting back the power consumption of the radio terminal controlling the power for transmission and improving the efficiency of utilization of the frequency owing to the reduction in interference among upward lines cannot be sufficiently obtained.

SUMMARY OF THE INVENTION

A first object of the present invention is to solve the aforementioned problems and to provide a mobile radio communication system having a radio zone covering some areas with overlapping sector cells using a plurality of sector antennas whose half-power beam widths angle are different from each other, which includes a method of selecting an appropriate antenna from a plurality of antennas assignable for a radio terminal which requests a call origination, and the method can obtain sufficiently an effect for improving the efficiency of utilization of a frequency owing to a reduction in interference by the antenna directivity simultaneously with an effect for decreasing power consumption of the radio terminal and improving the efficiency of utilization of a frequency owing to a reduction of interference among the upward lines.

A second object of the present invention is to provide a mobile radio communication system comprising a plurality of radio zones, a plurality of radio base stations each of them disposed in corresponding radio zones, a plurality of normal sector cells formed by dividing each of the individual radio zones so as to cover transmission and reception of a radio wave, a plurality of narrow sector cells provided so as to overlap the normal sector cells, a plurality of antennas connected to receiving means of corresponding radio base stations and having horizontal plane directional radiation patterns corresponding to sector cells which belong to the radio base stations, and a plurality of radio terminals located within the radio zones, for communicating with the radio base stations respectively with a radio channel assigned from a plurality of radio channels as a communication channel, each of the radio base stations having antenna selecting means for selecting preferentially, in response to a call origination request from a radio terminal, an antenna whose sum of a value expressed in decibels of received power of a desired radio wave and a constant predetermined for each antenna according to a half-power beam width angle of the horizontal plane directional radiation pattern is maximum when a plurality of radio channels are assignable through the plurality of antennas.

The constant is preferably equal to the product of a common logarithm of a square root of the half-power beam width angle, a value obtained by a decibel value of increase in attenuation of the radio wave per distance of ten times and −1.

Further, the half-power beam widths of the antennas corresponding cells having the horizontal plane directional radiation pattern are either 120° or 60°.

A third object of the present invention is to provide an antenna selecting method employed in a radio zone with a sector configuration, in a mobile radio communication system comprising, a plurality of radio zones, a plurality of radio base stations each of them disposed in corresponding radio zone, a plurality of normal sector cells formed by dividing each of the individual radio zones so as to cover transmission and reception of a radio wave, a plurality of narrow sector cells provided so as to overlap the plurality of normal sector cells, a plurality of antennas connected to receiving means of corresponding radio base stations and having horizontal-plane radiation patterns corresponding to the sector cells which belong to the radio base stations and a plurality of radio terminals located within the radio zones, communicating with the radio base stations respectively with a radio channel assigned from a plurality of radio channels as a communication channel, wherein each of the radio base stations further comprise the step of selecting preferentially, in response to a call origination request from a radio terminals, an antenna whose sum of a value expressed in decibels of received power of a desired radio wave and a constant predetermined for each antenna according to a half-power beam width of the horizontal plane directional radiation pattern is maximum when a plurality of radio channels are assignable through the plurality of antennas.

Further, the present invention also includes a case where the constant is equal to the product of a common logarithm of a square root of the half-power beam width, a value obtained by a decibel value of increase in attenuation of the radio wave per distance of ten times and −1 and a case where the half-power beam width of the antenna for corresponding cell having the horizontal plane directional radiation pattern are either 120° or 60°.

BRIEF DESCRIPTION OF THE DRAWINGS

The above and other objects, features and advantages of the present invention will become apparent from the following description and appended claims, taken in conjunction with the accompanying drawings in which:

DETAILED DESCRIPTION OF THE PREFERRED EMBODIMENT

The present invention will hereinafter be described with reference to the accompanying drawings.

Figure 1:
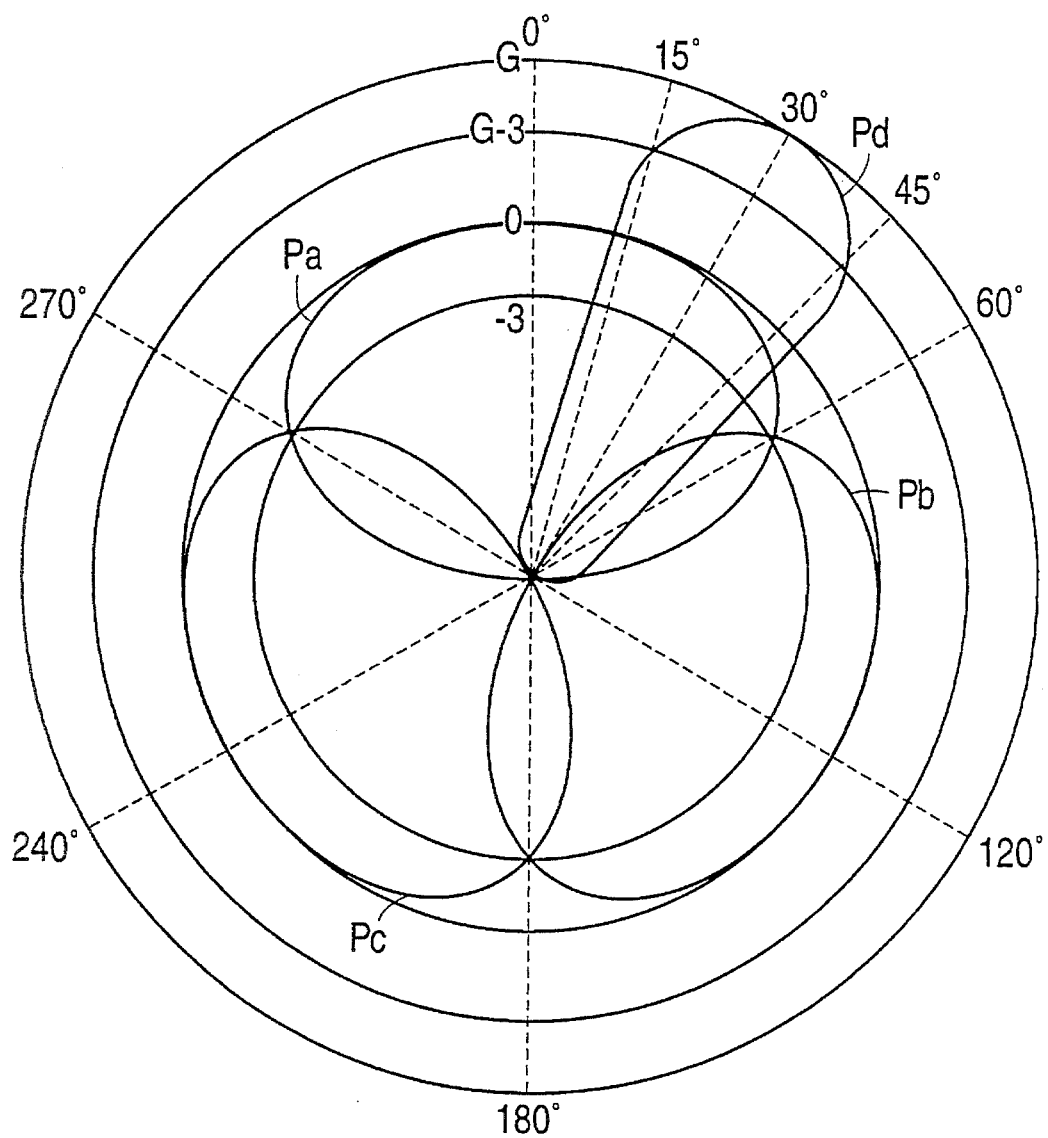
FIG. 1 is a view for describing directivities of a plurality of sector antennas which belong to one radio base station employed in one embodiment of a mobile radio communication system having zones of sector configurations, according to the present invention.

FIG. 1 is a view for explaining directivities of a plurality of sector antennas which belong to one radio base station employed in one embodiment of a mobile radio communication system having zones of sector configuration, according to the present invention.

Figure 2:
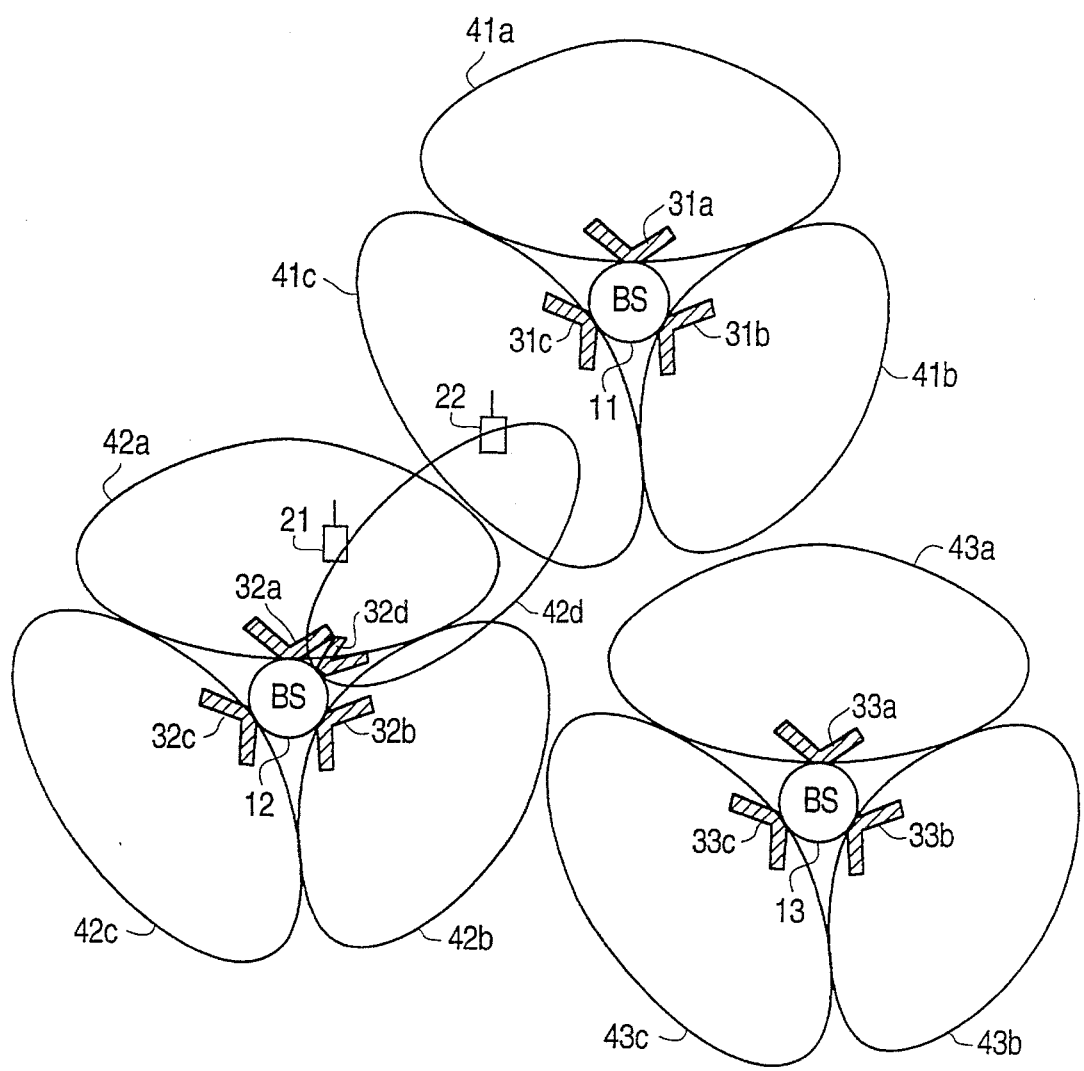
FIG. 2 is a view for describing the concept of the sector antennas and sector cells both employed in the embodiment shown in FIG. 1.

FIG. 2 is a view for describing the concept of the sector antennas and sector cells employed in the embodiment shown in FIG. 1.

Figure 3:
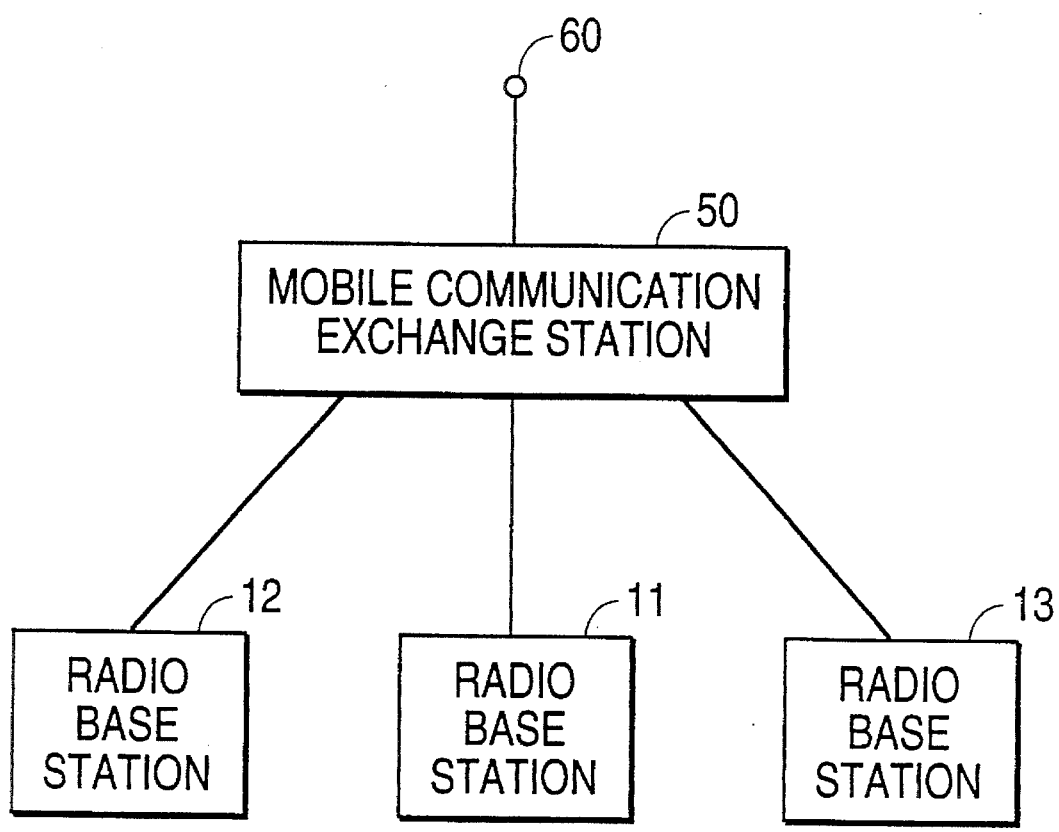
FIG. 3 is a block diagram showing the structure of a wired portion of the mobile radio communication system shown in FIG. 1.

As shown in FIG. 2, a mobile radio communication system having zones of the sector configuration comprises radio base stations (BS) 11, 12 and 13. Three sector antennas 31a, 31b and 31c each having a horizontal plane directional radiation pattern whose half-power beam width angle is 120° are electrically connected to their corresponding input ends or terminals of a receiving unit of radio base-station 11. Sector antennas 31a, 31b and 31c respectively cover surroundings of radio base station 11, i.e., sector cells 41a, 41b and 41c each corresponding to the horizontal plane directional radiation patterns of the antennas. Likewise, three sector antennas 32a, 32b and 32c are electrically connected to their corresponding input terminals of a receiving unit of radio base station 12 and three sector antennas 33a, 33b and 33c are electrically connected to their corresponding input terminals of a receiving unit of radio base station 13. Sector antennas 32a, 32b and 32c cover sector cells 42a, 42b and 42c respectively in the same manner as described above. Further, sector antennas 33a, 33b and 33c cover sector cells 43a, 43b and 43c respectively. Radio base station 12 is provided with a sector antenna 32d having a horizontal plane radiation pattern whose half-power beam width angle is 30°. Sector antenna 32d serves so as to cover sector cell 42d. Now, each of radio base stations 11, 12 and 13 is arranged in an orientation shown in FIG. 2. The sector antennas and cells corresponding to each radio base station, having the same low-case alphabetic characters, respectively form directivities of the same orientations from each corresponding radio base stations. Radio terminal 21 is located in the neighborhood of sector cells 42a and 42d, whereas radio terminal 22 is located in the vicinity of sector cells 41c and 42d. Further, the mobile radio communication system includes a plurality of channels used for communications and one control channel used for connection control. As shown in FIG. 3, each of radio base stations 11, 12 and 13 is electrically connected to mobile communication exchange station 50. Mobile communication exchange station 50 has interface 60 to be connected or linked to a public network and can provide communications between a radio terminal linked to any one of the radio base stations and other radio terminal or a terminal in the public network.

FIG. 1 is a view for describing antenna lobes of sector antennas belonging to radio base station 12. Antenna lobes Pa, Pb, Pc and Pd respectively show horizontal plane directional radiation patterns of sector antennas 32a, 32b, 32c and 32d. The directivities Pa, Pb, Pc and Pd are represented in the form of relative gains expressed in decibels with the maximum gain of each of sector antennas 32a, 32b and 32c as 0dB. The half-power beam width angle of each of sector antennas 32a, 32b and 32c is 120°. The half-power beam width angle of sector antenna 32d is 30° and the maximum gain thereof is represented as GdB greater than 0dB. Sector antennas 31a, 31b and 31c and sector antennas 33a, 33b and 33c are respectively taken as identical to sector antennas 32a, 32b and 32c.

In the mobile radio communication system, a constant calculated based on the product of a common logarithm of a square root of each half-power beam width with respect to the directional gain or directivity of each sector antenna, a value of increase in attenuation of a radio wave per distance of ten times and −1 is set to each sector antenna. If the decibel value of increase in attenuation of the radio wave per distance of ten times is 40dB, then constants to be set to sector antennas 31a, 31b, 31c, 32a, 32b, 32c, 33a, 33b and 33c whose half-power beam width angle is 120°, reach $40 \times \log\sqrt{120} \times (-1) = -42$ (obtained by rounding off a number determined from this equation to the nearest whole number). On the other hand, a constant to be set to sector antenna 32d whose half-power beam width angle is 30°, is represented as $40 \times \log\sqrt{30} \times (-1) = -30$ (obtained by rounding off a number determined from this equation to the nearest whole number).

Now, consider a case that a call origination request is issued from radio terminal 21 located in the vicinity of sector cells 42a and 42d. Radio terminal 21 which requests the call origination sends a call origination request signal through a control channel. On the other hand, radio base stations surrounding terminal 21 receive the call origination request signal from radio terminal 21 through their corresponding sector antennas and measure their received signal levels. Radio base station 11 measures the received signal levels through sector antennas 31a, 31b and 31c. However, it is assumed that all the received signal levels are less than a predetermined allowable level of connection. Radio base station 12 measures, in decibels, received signal levels D32a, D32b, D32c and D32d received from radio terminal 21 using the sector antennas 32a, 32b, 32c and 32d. Now, it is assumed that the received signal levels D32a and D32d through sector antennas 32a and 32d are more than or equal to the allowance level of connection. Radio base station 12 compares summed value Sa obtained by adding constant −42 set to sector antenna 32a to received signal level D32a through sector antenna 32a and summed value Sd obtained by adding constant −30 set to sector antenna 32d to received signal level D32d through sector antenna 32d and selects a sector antenna having the maximum summed value. Assuming that radio terminal 21 is located outside the lobe having larger directional gain or directivity of sector antenna 32d, value Sa is greater than value Sd. Accordingly, radio base station 12 selects sector antenna 32a and notifies value Sa to the mobile communication exchange station 50. Radio base station 13 also measures received signal levels in the same manner as described above. Since, however, all the received signal levels are less than the predetermined allowance level of connection between radio base station 13 and radio terminal 21, radio base station 13 does not send a notice of its information to mobile communication exchange station 50. Since no notification is sent from other radio base stations, mobile communication exchange station 50 that has received notification from radio base station 12, determines to provide connection between radio base station 12 and radio terminal 21 and notifies radio base station 12 of its connection. On the other hand, notified radio base station 12 assigns a channel to radio terminal 21 through the sector antenna 32a and starts to communicate with the radio terminal 21.

As a second example, when a call origination request is issued through a control channel from the radio terminal 22 located in the neighborhood of the sector cells 41c and 42d, the radio base stations surrounding radio terminal 22 receive the call origination request signal from the radio terminal 22 through their corresponding sector antennas and measure their received levels. Radio base station 11 measures the received signal levels through sector antennas 31a, 31b and 31c. Since, however, radio terminal 22 is located within a lobe of sector antenna 31c of radio base station 11, received signal level D31c (expressed in decibels) through sector antenna 31c is maximum. Therefore, if the received level D31c is more than or equal to the allowance value of connection between radio base station 11 and radio terminal 22, then radio base station 11 notifies summed value S11 obtained by adding the constant −42 set to sector antenna 31c to mobile communication exchange station 50. Likewise, radio base station 12 receives the signal sent from the radio terminal 22 using the sector antennas 32a, 32b, 32c and 32d and measures the received signal levels. Of these, the received signal level D32d (expressed in decibels) of the sector antenna 32d is maximum and is more than or equal to the allowance value of connection between radio base station 12 and radio terminal 22. Therefore, radio base station 12 notifies value S12 obtained by adding the constant −30 set to sector antenna 32d to the received signal level D32d to mobile communication exchange station 50. Although radio base station 13 also measures the received signal levels in the same manner as described above, all the received levels are less than the allowance value of the connection. Therefore, the radio base station 13 does not notify the result of measurement to mobile communication exchange station 50. Mobile communication exchange station 50 when receiving the above values from the radio base stations 11 and 12, compares values S11 and S12 and selects the radio base station providing the maximum value. Radio terminal 22 is located closer to radio base station 11 then it is to radio base station 12. Since, however, the sector 42d covered with directivity Pd of the sector antenna 32d, in which radio terminal 22, is larger than the directivity gain 0dB of the sector antenna 31c and the constant −30 set to sector antenna 32d is greater than the constant −42 set to sector antenna 31c, the value S12 is determined to be the maximum. Thus, mobile communication exchange station 50 selects radio base station 12 and notifies the result of selection to radio base station 12. On the other hand, radio base station 12 assigns a radio channel usable for communicating with radio terminal 22 through the sector antenna 32d to radio terminal 22 and starts to communicate with radio terminal 22.

If sector antennas are used as antennas for a radio base station, then interference with other radio terminals by the radio base station and interference suffered from other radio terminals can be reduced. The amount of reduction in the interference increases as the half-power beam width of each sector antenna decreases. Further, if a radio terminal controls transmitting power in such a manner that each of received signal levels measured by a radio base station maintains a predetermined level required to communicate with the radio terminal, then interference with other radio base stations can be reduced and the amount of reduction in the interference increases as the transmitting power decreases.

In the illustrated embodiment, large constants are set for sector antennas whose half-power beam width are small, and an antenna having a large value obtained by adding the constants to the measured values of received signal levels is selected. As a result, a sector antenna providing the maximum value is selected and used for communication. Thus, even if the received level of the sector antenna whose half-power beam width is small, is slightly less, the sector antenna whose half-power beam width is small is selected. Therefore, the interference with other radio terminals by the radio base station and interference suffered from other radio terminals are reduced.

When the sector antenna whose received signal level is less as described above, is used in a system wherein the radio terminal controls the transmitting power so that the received signal level measured at the radio base station is kept at or above the predetermined level necessary to communicate with the radio terminal, the interference with other radio terminals by the radio base station and the interference suffered from other radio terminals can be reduced as compared with the case where the sector antenna whose received level is largest, is used. While on the contrary, the radio terminal needs large transmitting power. Further, the interference with other radio base stations by the radio terminal increases.

Now, we assume that a range in which the radio base station exerts an interfering wave of a predetermined level or more on each radio terminal is as the degree of influence of the interference. In a system having a condition that a channel is allowed to be used when the received level of interfering wave is less than or equal to a predetermined level, for example, the allowable interval for using a same channel is determined depending on the range in which the interfering wave having the predetermined level or more is exerted. We will describe below a reduction in the influence degree of interference by a sector antenna whose half-power beam width is small and an increase in the influence degree of interference by increasing transmitting power with a sector antenna whose received signal level is low.

The degree of influence of the interference with a radio terminal by a radio base station where a sector antenna is used, is substantially proportional to the half-power beam width angle of the sector antenna. The degree of influence of the interference with the radio base station by the radio terminal when the sector antenna is used, is also substantially proportional to the half-power beam width angle of the sector antenna in the same manner as described above. Thus, in the illustrated embodiment, the influence degree of interference with a sector antenna whose half-power beam width is 30° is one-fourth ($\frac{1}{4}=\frac{30}{120}$) the influence degree of interference with a sector antenna whose half-power beam width angle is 120°.

On the other hand, the degree of influence of the interference with the radio base station by the radio terminal increases as the transmitting power becomes greater. When an increase in the influence degree of interference according to the increase in the transmitting power is smaller than a reduction in the influence degree of interference by a sector antenna whose half-power beam width is small, it can be considered that the influence degree of interference is reduced as a whole.

As illustrated in the embodiment, when the constant is calculated based on the product of the common logarithm of a square root of each half-power beam width of the directional gain or directivity of each sector antenna, the value obtained by the decibel value of increase in attenuation of the radio wave per distance of ten times and −1, the decibel value of increase in attenuation of the radio wave per distance of ten times is 40dB, then the constant set to each of the sector antennas whose each half-power beam width is 120° is represented as −42dB, and the constant to be set to the sector antenna 32d whose half-power beam width angle is 30° is represented as −30dB. Since the constant set for the sector antenna whose half-power beam width is 30° is 12dB greater as compared with that set for each sector antenna whose half-power beam widths are 120°, the sector antenna whose half-power beam width is 30° with received signal level is low is often selected if the difference between received signal levels is less than 12dB. Accordingly, the amount of increase in the transmitting power of the radio terminal is 12dB at most. If an interfering range is developed circular in this case, then the radius thereof is increased by a distance equivalent to the amount of increase in attenuation of 12dB. If the amount of increase in attenuation of the radio wave per distance of 10 times is assumed as 40dB, then the amount of increase in attenuation of the radio wave per distance of r times is represented as 40log(r). If this equation is equal to 12dB, then r becomes equal to 2. Thus, when the transmitting power is increased to 12dB, the radius of the interfering range is doubled and its area reaches four times.

Since the influence degree of interference by using the sector antenna whose half-power beam width 30° reaches one-fourth the influence degree of interference by using the sector antenna whose half-power beam width angle is 120°, the entire influence degree of interference, which is obtained by adding the amount of decrease in the range of interference with a radio base station to an increase in the interfering range with a radio terminal, is brought to the same degree even if the interfering range of the radio terminal, i.e., the influence degree of interference reaches four times according to an increase in the transmitting power. Thus, the influence degree of interference is brought to the same degree even in the worst case so long as the constants are set as illustrated in the embodiment. When the increase in the transmitting power is kept smaller than the difference between the constants set to the sector antennas and narrow sector antennas are used, the influence degree of interference can be reduced as a whole.

When it is desired to control the transmitting power as described above, the amount of increase in the transmitting power does not exceed the difference between the constants set to the sector antennas, hence an effect for controlling or reducing the transmitting power consumption of a radio terminal is not so reduced.

The present invention has been described in detail by the illustrated embodiment. However, the present invention can be applied to a fixed channel assigning system (wherein channels used for respective zones are fixedly assigned in advance in consideration of mutual interference conditions between the zones) and a dynamic channel assigning system (wherein a radio base station selects a channel from all the channels in succession for each request of communication and the selected channel is assigned if a predetermined assignment condition is met) without any problem. Further, the present embodiment describes, as an illustrative example, the case where the channel is assigned for a request of call origination. However, the present invention can be applied, without any problem, even to the case where antennas and channels are successively selected in accordance with the method according to the present invention during communication.

According to the present invention, as has been described above, a mobile radio communication system having a plurality radio zones with sector configuration constructed so as to cover the same areas with overlapping sector antennas whose half-power beam widths are different from each other, can bring about a sufficient effect for improving the efficiency of utilization of channels owing to a reduction in interference by preferential section of the small half power beam width antenna having high directivity.

What is claimed is:
1. A mobile radio communication system, comprising:
a plurality of radio zones, each radio zone having disposed therein a radio base station including a receiving means and an antenna selecting means;
a plurality of normal sector cells formed in said each radio zone by dividing said each radio zone so as to cover transmission and reception of a radio wave;
at least one narrow sector cell provided so as to overlap at least two normal sector cells;
a plurality of antennas disposed in said each radio zone and connected to the receiving means of the radio base station disposed in said each radio zone, said antennas generating horizontal plane directional radiation patterns corresponding to said plurality of normal sector cells and said at least one narrow sector cell in said each radio zone; and
a plurality of radio terminals located within said radio zones, for communicating with the radio base station with a radio channel assigned from a plurality of radio channels as a communication channel;
wherein each antenna selecting means, in response to a communication request from one of said radio terminals, selects an antenna among said plurality of antennas having a sum which is maximum, said sum being determined as an added result of a value expressed in decibels of received power of a desired radio wave and a constant predetermined for each antenna according to a half-power beam width of the horizontal plane directional radiation pattern generated by said each antenna.

2. The mobile radio communication system as claimed in claim 1, wherein said constant is equal to a product of a common logarithm of a square root of the half-power beam width, a decibel value of increase in attenuation of the desired radio wave per distance of ten times, and −1.

3. The mobile radio communication system as claimed in claim 2, wherein the half-power beam width of said each antenna for a corresponding one of said normal sector cells is either 120° or 60° and for a corresponding one of said narrow sector cells is 30°.

4. The mobile radio communication system as claimed in claim 1, wherein the half-power beam width of said each antenna for a corresponding one of said normal sector cells is either 120° or 60° and for a corresponding one of said narrow sector cells is 30°.

5. A method of selecting an antenna by a radio base station in a radio zone with a sector configuration in a mobile communication system which includes a plurality of radio zones, a plurality of radio base stations each disposed in a corresponding one of said radio zones, a plurality of normal sector cells formed by dividing each of the radio zones so as to cover transmission and reception of a radio wave, a plurality of narrow sector cells provided so as to overlap said plurality of normal sector cells, a plurality of antennas connected to receiving means of each of said plurality of radio base stations and having horizontal plane directional radiation patterns corresponding to the normal and the narrow sector cells which belong to said corresponding radio base stations, and a plurality of radio terminals located within said radio zones, for communicating with said corresponding radio base stations respectively with a radio channel assigned from a plurality of radio channels as a communication channel, wherein said method comprises a step of selecting preferentially, in response to a communication request from one of said radio terminals, one of said antennas having a sum of a value expressed in decibels of received power of a desired radio wave and a constant predetermined for each of said antennas according to a half-power beam width of the horizontal plane directional radiation pattern that is maximum when at least one of said radio channels through said one of said antennas is assignable.

6. The method as claimed in claim 5, wherein said constant is equal to a product of a common logarithm of a square root of the half-power beam width, a decibel value of increase in attenuation of the desired radio wave per distance of ten times, and −1.

7. The mobile radio communication system as claimed in claim 6, wherein the half-power beam width of said each of said antennas for a corresponding one of said normal sector cells is either 120° or 60° and for a corresponding one of said narrow sector cells is 30°.

8. The mobile radio communication system as claimed in claim 5, wherein the half-power beam width of said each of said antennas for a corresponding one of said normal sector cells is either 120° or 60° and for a corresponding one of said narrow sector cells is 30°.

* * * * *